United States Patent
Hagen et al.

(10) Patent No.: US 9,541,686 B2
(45) Date of Patent: Jan. 10, 2017

(54) SHEET WITH COATING WHICH REFLECTS THERMAL RADIATION

(71) Applicant: SAINT-GOBAIN GLASS FRANCE, Courbevoie (FR)

(72) Inventors: Jan Hagen, Bonn (DE); Martin Melcher, Herzogenrath (DE); Juliette Ruchmann, Saint Germain en Laye (FR); Julia Vincent, Leeds (GB)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 116 days.

(21) Appl. No.: 14/367,733

(22) PCT Filed: Jan. 16, 2013

(86) PCT No.: PCT/EP2013/050698
§ 371 (c)(1),
(2) Date: Jun. 20, 2014

(87) PCT Pub. No.: WO2013/131667
PCT Pub. Date: Sep. 12, 2013

(65) Prior Publication Data
US 2015/0146286 A1 May 28, 2015

(30) Foreign Application Priority Data
Mar. 5, 2012 (EP) .................... 12158005

(51) Int. Cl.
*G02B 5/20* (2006.01)
*C03C 17/34* (2006.01)
(Continued)

(52) U.S. Cl.
CPC ............... *G02B 5/208* (2013.01); *B60J 1/00* (2013.01); *C03C 17/3435* (2013.01); *G02B 1/11* (2013.01);
(Continued)

(58) Field of Classification Search
CPC ............ G02B 1/00; G02B 1/10; G02B 1/105; G02B 1/11; G02B 1/113; G02B 1/115; G02B 1/116; G02B 1/12; G02B 5/28; G02B 5/281; G02B 5/282; G02B 5/285; G02B 5/286; F21S 11/00
(Continued)

(56) References Cited

U.S. PATENT DOCUMENTS 4,507,547 A 3/1985 Taga et al.
4,910,088 A 3/1990 Baudin et al.
(Continued)

FOREIGN PATENT DOCUMENTS

EP 877006 11/1998
EP 1047644 B1 1/2003
(Continued)

OTHER PUBLICATIONS

International Search Report mailed on Apr. 15, 2013 for PCT/EP2013/050698 filed on Jan. 16, 2013 in the name of SAINT-GOBAIN GLASS FRANCE—German Original with English Translation.

*Primary Examiner* — Arnel C Lavarias
(74) *Attorney, Agent, or Firm* — Steinfl & Bruno, LLP

(57) ABSTRACT

A sheet is described. The sheet has at least one substrate and at least one coating, which reflects thermal radiation, on at least one surface of the substrate, wherein the coating on the substrate contains at least one adhesion layer, a functional layer containing at least one transparent, electrically conductive oxide, above the adhesion layer, a dielectric barrier layer, for regulating oxygen diffusion, above the functional layer, and an antireflection layer above the barrier layer, wherein the barrier layer has a thickness from 10 nm to 40 nm.

20 Claims, 4 Drawing Sheets

Figure 1:
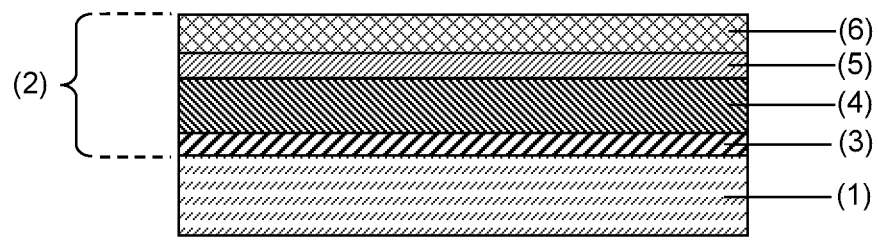

(51) Int. Cl.
  *B60J 1/00* (2006.01)
  *G02B 1/11* (2015.01)
  *G02B 5/26* (2006.01)

(52) U.S. Cl.
  CPC ............. *G02B 5/26* (2013.01); *C03C 2217/78* (2013.01); *C03C 2217/94* (2013.01); *C03C 2217/948* (2013.01)

(58) Field of Classification Search
  USPC ....... 359/359, 350, 355, 356, 357, 360, 591, 359/597, 598, 601, 609, 614, 580, 581, 359/582, 585, 586, 588, 589, 590
  See application file for complete search history.

(56) References Cited

U.S. PATENT DOCUMENTS

| | | |
|---|---|---|
| 6,432,545 B1 | 8/2002 | Schicht et al. |
| 7,858,193 B2 | 12/2010 | Ihlo et al. |
| 9,108,882 B2 | 8/2015 | Gouardes et al. |
| 2002/0192473 A1 | 12/2002 | Gentilhomme et al. |
| 2006/0182980 A1* | 8/2006 | Barton ............. B32B 17/10036 428/432 |
| 2009/0047509 A1* | 2/2009 | Gagliardi ................ C03C 17/36 428/336 |
| 2009/0117371 A1 | 5/2009 | Glaeser et al. |
| 2011/0146172 A1 | 6/2011 | Mauvernay et al. |

FOREIGN PATENT DOCUMENTS

| | | |
|---|---|---|
| EP | 1218307 B1 | 7/2008 |
| EP | 1917222 B1 | 3/2009 |
| EP | 2247549 B1 | 7/2012 |
| JP | 2006-256902 A | 9/2006 |
| WO | 0029347 | 5/2000 |
| WO | 2007042688 | 4/2007 |
| WO | 2009112759 | 9/2009 |
| WO | 2011088330 A2 | 7/2011 |
| WO | 2011105991 | 9/2011 |
| WO | 2012022876 | 2/2012 |
| WO | 2012131243 | 10/2012 |

* cited by examiner

SHEET WITH COATING WHICH REFLECTS THERMAL RADIATION

CROSS REFERENCE TO RELATED APPLICATIONS

The present application is the US national stage of International Patent Application PCT/EP2013/050698 filed on Jan. 16, 2013 which, in turn, claims priority to European Patent Application EP 12158005.4 filed on Mar. 5, 2012.

The invention relates to a pane with thermal radiation reflecting coating, a method for its production, and its use.

The interior of a motor vehicle can heat up greatly in the summer with high ambient temperatures and intense direct sunlight. When the outside temperature is lower than the temperature in the vehicle interior, which occurs in particular in the winter, a cold pane acts as a heat sink, which is perceived as unpleasant by the occupants. High heating performance of the air-conditioning system must be provided to prevent excessive cooling of the interior through the motor vehicle windows.

Thermal radiation reflecting coatings (so-called "low-E coatings") are known. Such a coating reflects a significant part of solar radiation, in particular in the infrared range, which, in the summer, results in reduced warming of the vehicle interior. Moreover, the coating reduces the emission of long-wave thermal radiation of a heated pane into the vehicle interior when the coating is applied on the surface of a pane facing the vehicle interior. Moreover, in the case of low outside temperatures, such a coating reduces the outward emission of heat from the interior into the external surroundings.

A thermal radiation reflecting coating can contain, for example, functional layers made of niobium, tantalum, or zirconium. Such coatings are known, for example, from US 20110146172 A1, EP 1 218 307 B1, and EP 2 247 549 A2. Such coatings result in the fact that the transmittance of the pane in the visible spectral range is clearly reduced. Consequently, the coatings cannot be used on panes for which legal requirements with regard to transmittance must be met, for example, windshields or front side windows. Coatings that reflect thermal radiation with functional layers made of silver are also known, for example, from EP 877 006 B1, EP 1 047 644 B1, and EP 1 917 222 B1. However, such coatings are susceptible to corrosion and not sufficiently resistant mechanically. Consequently, the coatings cannot be applied on the surface of a pane facing the vehicle interior, where the coating is exposed to the air and other environmental influences.

Frequently, after the application of the coating, panes are to be subjected to a thermal treatment and a mechanical transformation. Panes for the automotive sector, for example, windshields, side windows, and rear windows, are typically bent and frequently provided with prestressing or partial prestressing.

The object of the present invention consists in providing an improved pane with thermal radiation reflecting coating as well as a method for its production. The coating should be transparent and corrosion resistant and should not be damaged during bending and prestressing of the pane.

The object of the present invention is accomplished according to the invention by a pane with thermal radiation reflecting coating.

The pane according to the invention comprises at least one substrate and at least one thermal radiation reflecting coating on at least one surface of the substrate, wherein the coating on the substrate includes at least one adhesion layer,
above the adhesion layer, one functional layer that contains at least one transparent, electrically conductive oxide (TCO),
above the functional layer, one dielectric barrier layer for regulating oxygen diffusion, and
above the barrier layer, one antireflection layer,
and wherein the barrier layer has a thickness from 10 nm to 40 nm.

When a first layer is arranged above a second layer, this means, in the context of the invention, that the first layer is arranged farther from the substrate than the second layer. When a first layer is arranged below a second layer, this means, in the context of the invention, that the second layer is arranged farther from the substrate than the first layer.

When a first layer is arranged above or below a second layer, this does not necessarily mean, in the context of the invention, that the first and the second layer are situated in direct contact with each other. One or a plurality of additional layers can be arranged between the first and the second layer, unless this is explicitly ruled out.

When a layer or another element contains at least one material, this includes, in the context of the invention, the case in which the layer is made of the material.

The thermal radiation reflecting coating according to the invention has, in the visible spectral range, low absorption and low reflection and, consequently, high transmittance. Consequently, the coating can also be used on panes for which a significant reduction of transmittance is undesirable, for example, for windowpanes in buildings, or is legally prohibited, for example, for windshields or front side windows in motor vehicles. This is a major advantage of the invention. The coating according to the invention is also corrosion resistant. Consequently, the coating can be applied to the surface of the substrate that is intended, in the installed position of the pane, to face the interior, for example, of a motor vehicle or a building. In summer, the coating according to the invention particularly effectively reduces the emission of thermal radiation of the pane into the interior and, in winter, the outward emission of heat into the external surroundings.

It has been demonstrated that the oxygen content of the functional layer decisively influences the properties of the thermal radiation reflecting coating with regard to emissivity, transmittance in the visible spectral range, and bendability. An excessively low oxygen content results in high absorption of visible light and, thus, in low transmittance. An excessively low oxygen content further results in an excessively high sheet resistance and, thus, in excessively high emissivity. An excessively low oxygen content also results in a significant, often undesirable color impression. An excessively high oxygen content of the functional layer results in the fact that the functional layer is damaged during bending. Such damage is particularly evident as cracks within the functional layer. An excessively high oxygen content further results, as does an excessively low oxygen content, in excessively high sheet resistance and, thus, in excessively high emissivity.

The interior-side emissivity of the pane according to the invention is preferably less than or equal to 25%, particularly preferably less than or equal to 20%. The term "interior-side emissivity" refers to the measurement that indicates how much thermal radiation the pane gives off into an interior space, for example, a building or a motor vehicle, in the installed position compared to an ideal thermal emitter (a black body). In the context of the invention, "emissivity" means the normal level of emission at 283 K according to the standard EN 12898. The sheet resistance of the coating according to the invention is preferably from 10 ohm/square to 30 ohm/square. The absorption of the coating according to the invention in the visible spectral range is preferably from roughly 1% to roughly 15%, particularly preferably from roughly 1% to roughly 7%. The absorption of the coating can be determined by measuring the absorption of a coated pane and subtracting the absorption of the uncoated pane. The pane according to the invention preferably has, during reflection, a color value a* from −15 to +5 and a color value b* from −15 to +5, observed from the side with the coating according to the invention. The data a* and b* refer to the color coordinates in accordance with the colorimetric model (L*a*b* color space).

To obtain the indicated preferred values for emissivity, sheet resistance, absorption, and the color values during reflection, the substrate can be subjected to a temperature treatment after the application of the thermal radiation reflecting coating. The substrate is preferably heated to a temperature of at least 200° C., particularly preferably at least 300° C. Such a temperature treatment influences in particular the crystallinity of the functional layer and results in improved transmittance of the coating according to the invention. The temperature treatment also reduces the sheet resistance of the coating, which results in reduced emissivity.

After application and before a temperature treatment, the functional layer preferably has an oxygen content such that the sheet resistance of the coating according to the invention is from 50 ohm/square to 250 ohm/square, particularly preferably from 80 ohm/square to 150 ohm/square. The specific resistance of the functional layer is, after application of the coating and before the temperature treatment, preferably from $500*10^{-6}$ ohm*cm to $3500*10^{-6}$ ohm*cm, particularly preferably from $1000*10^{-6}$ ohm*cm to $2000*10^{-6}$ ohm*cm. The absorption of the coating in the visible spectral range is, after application and before the temperature treatment, preferably from 8% to 25%, particularly preferably from 13% to 20%. The oxygen content can, for example, be influenced during application of the functional layer by cathode sputtering through the selection of the target and/or through the oxygen content of the atmosphere. The oxygen content that is suitable for a sheet resistance and for an absorption in the ranges indicated can be determined by the person skilled in the art, for example, by simulations or experiments.

It has been demonstrated that the temperature treatment, due to the diffusion of oxygen, results in oxidation of the functional layer. By means of the barrier layer according to the invention, the extent of oxidation of the functional layer can be influenced. The range according to the invention for the thickness of the barrier layer from 10 nm to 40 nm is particularly advantageous with regard to the visible-light transmittance, the sheet resistance, and, in particular, the bendability of the coating. A thinner barrier layer results in an excessively high oxygen content of the functional layer after the temperature treatment. A thicker barrier layer results in an excessively low oxygen content of the functional layer after the temperature treatment. The influence of the barrier layer on the oxygen content of the functional layer is another major advantage of the invention.

The thickness of the barrier layer is preferably from 10 nm to 30 nm, particularly preferably 12 nm to 30 nm, most particularly preferably from 15 nm to 25 nm, and in particular from 18 nm to 22 nm. Particularly good results are thus achieved with regard to visible-light transmittance, sheet resistance, and flexibility. However, the thickness of the barrier layer can also be, for example, from 10 nm to 18 nm or from 12 nm to 18 nm.

Moreover, the barrier layer influences the corrosion resistance of the coating according to the invention. A thinner barrier layer results in excessive susceptibility to corrosion from a moist atmosphere. The corrosion of the coating results, in particular, in a significant increase in the absorption of visible light by the coating.

In addition, the barrier layer influences the optical properties of the thermal radiation reflecting coating, in particular the color impression during the reflection of light. According to the invention, the barrier layer is dielectric. The refractive index of the material of the barrier layer is preferably greater than or equal to the refractive index of the material of the functional layer. The refractive index of the material of the barrier layer is particularly preferably from 1.7 to 2.3.

The values indicated for refractive indices are measured at a wavelength of 550 nm.

The barrier layer preferably contains at least one oxide and/or one nitride. The oxide and/or nitride can be stoichiometric or non-stoichiometric. The barrier layer particularly preferably contains at least silicon nitride ($Si_3N_4$). This is particularly advantageous with regard to the influence of the barrier layer on the oxidation of the functional layer and the optical properties of the pane. The silicon nitride can have dopants, for example, titanium, zirconium, boron, hafnium, and/or aluminum. The silicon nitride is most particularly preferably doped with aluminum ($Si_3N_4$:Al) or doped with zirconium ($Si_3N_4$:Zr) or doped with boron ($Si_3N_4$:B). This is particularly advantageous with regard to the optical properties, the flexibility, the smoothness, and the emissivity of the coating as well as the speed of the application of the barrier layer, for example, by cathode sputtering.

The silicon nitride is preferably deposited using magnetic field-supported cathode sputtering preferably with a target that contains at least silicon. The target for the deposition of a barrier layer containing aluminum-doped silicon nitride preferably contains from 80 wt.-% to 95 wt.-% silicon and from 5 wt.-% to 20 wt.-% aluminum as well as production-related admixtures. The target for the deposition of a barrier layer containing boron-doped silicon nitride preferably contains from 99.9990 wt.-% to 99.9999 wt.-% silicon and from 0.0001 wt.-% to 0.001 wt.-% boron as well as production-related admixtures. The target for the deposition of a barrier layer containing zirconium-doped silicon nitride preferably contains from 60 wt.-% to 90 wt.-% silicon and from 10 wt.-% to 40 wt.-% zirconium as well as production-related admixtures. The deposition of the silicon nitride is preferably done under the addition of nitrogen as reaction gas during the cathode sputtering.

During a temperature treatment after the application of the coating according to the invention, the silicon nitride can be partially oxidized. A barrier layer deposited as $Si_3N_4$ then contains, after the temperature treatment, $Si_xN_yO_z$, with the oxygen content typically from 0 atomic-% to 35 atomic-%.

However, the barrier layer can alternatively contain, for example, at least $WO_3$, $Nb_2O_5$, $Bi_2O_3$, $TiO_2$, $Zr_3N_4$, and/or AlN.

The adhesion layer results in durably stable adhesion of the layers deposited above the adhesion layer on the substrate. The adhesion layer further prevents accumulation of ions diffusing out of the substrate in the boundary region on the functional layer, in particular of sodium ions, if the substrate is made of glass. Such ions can result in corrosion and in low adhesion of the functional layer. The adhesion layer is, consequently, particularly advantageous with regard to the stability of the functional layer.

The material of the adhesion layer preferably has a refractive index in the range of the refractive index of the substrate. The material of the adhesion layer preferably has a lower refractive index than the material of the functional layer. The adhesion layer preferably contains at least one oxide. The adhesion layer particularly preferably contains silicon dioxide ($SiO_2$). This is particularly advantageous with regard to the adhesion of the layers on the substrate deposited above the adhesion layer. The silicon dioxide can have dopants, for example, fluorine, carbon, nitrogen, boron, phosphorus, and/or aluminum. The silicon dioxide is most particularly preferably doped with aluminum ($SiO_2$:Al), doped with boron ($SiO_2$:B), or doped with zirconium ($SiO_2$:Zr). This is particularly advantageous with regard to the optical properties of the coating as well as the speed of the application of the adhesion layer, for example, by cathode sputtering.

The silicon dioxide is preferably deposited using magnetic field-supported cathode sputtering with a target that contains at least silicon. The target for the deposition of an adhesion layer containing aluminum-doped silicon dioxide preferably contains from 80 wt.-% to 95 wt.-% silicon and from 5 wt.-% to 20 wt.-% aluminum as well as production-related admixtures. The target for the deposition of an adhesion layer containing boron-doped silicon dioxide preferably contains from 99.9990 wt.-% to 99.9999 wt.-% silicon and from 0.0001 wt.-% to 0.001 wt.-% boron as well as production-related admixtures. The target for the deposition of an adhesion layer containing zirconium-doped silicon dioxide preferably contains from 60 wt.-% to 90 wt.-% silicon and from 10 wt.-% to 40 wt.-% zirconium as well as production-related admixtures. The deposition of the silicon dioxides is preferably done under addition of oxygen as a reaction gas during the cathode sputtering.

The doping of the adhesion layer can also improve the smoothness of the layers applied above the adhesion layer. High smoothness of layers is particularly advantageous in the case of use of the pane according to the invention in the motor vehicle sector since, by this means, an unpleasant rough surface feel of the pane is avoided. When the pane according to the invention is a side window pane, it can be moved with low friction to the sealing lips.

However, the adhesion layer can also contain other materials, for example, other oxides such as $TiO_2$, $Al_2O_3$, $Ta_2O_5$, $Y_2O_3$, ZnO, and/or $ZnSnO_x$ or nitrides such as AlN.

The adhesion layer preferably has a thickness from 10 nm to 150 nm, particularly preferably from 15 nm to 50 nm, for example, roughly 30 nm. This is particularly advantageous with regard to the adhesion of the coating according to the invention and the prevention of the diffusion of ions from the substrate into the functional layer.

An additional adhesion-promoting layer can be arranged below the adhesion layer, preferably with a thickness from 2 nm to 15 nm. For example, the adhesion layer can contain $SiO_2$, and the additional adhesion-promoting layer can contain at least one oxide such as $TiO_2$, $Al_2O_3$, $Ta_2O_5$, $Y_2O_3$, ZnO, and/or $ZnSnO_x$, or one nitride such as AlN. Advantageously, the adhesion of the coating according to the invention can be further improved by the adhesion-promoting layer. Moreover, the adhesion-promoting layer enables improved adjustment of the color values and the transmittance or reflection.

The functional layer has reflecting properties for thermal radiation, in particular infrared radiation, yet is largely transparent in the visible spectral range. According to the invention, the functional layer contains at least one transparent, electrically conductive oxide (TCO). The refractive index of the material of the functional layer is preferably from 1.7 to 2.5. The functional layer preferably contains at least indium tin oxide (ITO). Thus, particularly good results are obtained with regard to the emissivity and the bendability of the coating according to the invention.

The indium tin oxide is preferably deposited using magnetic field-supported cathode sputtering with a target made of indium tin oxide. The target preferably contains from 75 wt.-% to 95 wt.-% indium oxide and from 5 wt.-% to 25 wt.-% tin oxide as well as production-related admixtures. The deposition of the indium tin oxide is preferably done under a protective gas atmosphere, for example, argon. A small amount of oxygen can also be added to the protective gas, for example, to improve the homogeneity of the functional layer.

Alternatively, the target can preferably contain at least from 75 wt.-% to 95 wt.-% indium and from 5 wt.-% to 25 wt.-% tin. The deposition of the indium tin oxide is then done preferably under the addition of oxygen as reaction gas during the cathode sputtering.

The emissivity of the pane according to the invention can be influenced by the thickness of the functional layer. The thickness of the functional layer is preferably from 40 nm to 200 nm, particularly preferably from 90 nm to 150 nm, and most particularly preferably from 100 nm to 130 nm, for example, roughly 120 nm. In this range for the thickness of the functional layer, particularly advantageous values for emissivity and a particularly advantageous capability of the functional layer to withstand mechanical transformation such as bending or prestressing without damage are obtained.

However, the functional layer can also include other transparent, electrically conductive oxides, for example, fluorine-doped tin oxide ($SnO_2$:F), antimony-doped tin oxide ($SnO_2$:Sb), mixed indium/zinc oxide (IZO), gallium-doped or aluminum-doped zinc oxide, niobium-doped titanium oxide, cadmium stannate, and/or zinc stannate.

The antireflection layer reduces reflections in the visible spectral range on the pane according to the invention. By means of the antireflection layer, in particular, high transmittance in the visible spectral range through the pane according to the invention and a neutral color impression of reflected and transmitted light are obtained. The antireflection layer also improves the corrosion resistance of the functional layer. The material of the antireflection layer preferably has a refractive index that is less than the refractive index of the material of the functional layer. The refractive index of the material of the antireflection layer is preferably less than or equal to 1.8.

The antireflection layer preferably contains at least one oxide. The antireflection layer particularly preferably contains silicon dioxide ($SiO_2$). This is particularly advantageous with regard to the optical properties of the pane and the corrosion resistance of the functional layer. The silicon dioxide can have the dopants, for example, fluorine, carbon, nitrogen, boron, phosphorus, and/or aluminum. The silicon dioxide is most particularly preferably doped with aluminum ($SiO_2$:Al), doped with boron ($SiO_2$:B), or doped with zirconium ($SiO_2$:Zr).

However, the antireflection layer can also contain other materials, for example, other oxides such as $TiO_2$, $Al_2O_3$, $Ta_2O_5$, $Y_2O_3$, ZnO, and/or ZnSnO, or nitrides such as AlN.

The antireflection layer preferably has a thickness from 20 nm to 150 nm, particularly preferably from 40 nm to 100 nm. This is particularly advantageous with regard to low reflection and high visible-light transmittance as well as the setting of a selected color impression of the pane and corrosion resistance of the functional layer.

In an advantageous embodiment of the invention, a cover layer is arranged above the thermal radiation reflecting coating. The cover layer protects the coating according to the invention against damage, in particular against scratches. The cover layer preferably contains at least one oxide, particularly preferably at least titanium oxide ($TiO_x$), $ZrO_2$, $HfO_2$, $Nb_2O_5$, $Ta_2O_5$, $Cr_2O_3$, $WO_3$, and/or $CeO_2$. The thickness of the cover layer is preferably from 2 nm to 50 nm, particularly preferably from 5 nm to 20 nm. Thus, particularly good results are achieved with regard to scratch resistance.

The substrate preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

The thickness of the substrate can vary widely and thus be ideally adapted to the requirements of the individual case. Preferably, panes with the standard thicknesses from 1.0 mm to 25 mm and preferably from 1.4 mm to 4.9 mm are used. The size of the substrate can vary widely and is determined by the use according to the invention. The substrate has, for example, in the automotive sector and in the architectural sector, customary areas from 200 cm$^2$ all the way to 20 m$^2$.

In an advantageous embodiment of the invention, the substrate has transmittance in the visible spectral range greater than or equal to 70%. However, the substrate can also have higher transmittance, for example, greater than or equal to 85%. Since the coating according to the invention has low absorption, panes with high transmittance in the visible spectral range which are, for example, suitable as windshields, can be realized. The pane according to the invention with thermal radiation reflecting coating preferably has total transmittance greater than 70%. The term "total transmittance" is based on the method for testing light permeability of motor vehicle windows specified by ECE-R 43, Annex 3, §9.1.

In an alternative advantageous embodiment, the substrate is tinted or colored. In that case, the substrate can preferably have transmittance in the visible spectral range of less than 50%, for example, of less than 15%. Thus, panes with a transparent coating according to the invention and with reduced transmittance in the visible spectral range can be realized. Such tinted or colored panes can be desirable, for example, for aesthetic or thermal reasons.

In an advantageous embodiment of the invention, the substrate is slightly or greatly curved in one or a plurality of spatial directions. Such curved panes occur, in particular, for glazings in the automotive sector. Typical radii of curvature of the curved panes are in the range from roughly 10 cm to roughly 40 m. The radius of curvature does not have to be constant over the entire pane; greatly curved and less greatly curved regions can be present in one pane. It is a particular advantage of the invention that a flat substrate can be provided with the coating according to the invention and that the coating is not damaged during a downstream bending process that is typically carried out at elevated temperatures from, for example, 500° C. to 700° C.

The barrier layer of the coating according to the invention on the curved substrate preferably has a thickness from 10 nm to 30 nm, particularly preferably from 12 nm to 30 nm, most particularly preferably from 15 nm to 25 nm, and in particular from 18 nm to 22 nm, for example, roughly 20 nm. This is particularly advantageous with regard to emissivity and visible-light transmittance as well as the capability of the coating to withstand mechanical transformation such as bending or prestressing of the substrate undamaged. However, the thickness of the barrier layer can also be, for example, from 10 nm to 18 nm or from 12 nm to 18 nm, which is advantageous with regard to material savings and visible-light transmittance.

In principle, the coating can, of course, also be applied to a curved substrate. The three-dimensional shape of the substrate preferably has no shadow zones such that the substrate can, for example, be coated by cathode sputtering.

In an alternative advantageous embodiment of the invention, the substrate is flat. Flat panes occur, for example, in glazings in the architectural sector or in large-area glazings of buses, trains, or tractors. In the context of the invention, the substrate is considered flat when its primary surfaces, through which an observer looks in the installed position, are not substantially curved, but are, instead, substantially flat. The primary surfaces do not necessarily have to be plane parallel.

The barrier layer of the coating according to the invention on a flat substrate preferably has a thickness from 10 nm to 25 nm, particularly preferably from 12 nm to 18 nm, and most particularly preferably from 14 nm to 16 nm, for example, roughly 15 nm. Since the coating need not be curved, the thickness of the barrier layer can be selected thinner than in the embodiment with a curved substrate. Thus, a higher oxygen content of the functional layer is obtained after a temperature treatment, which results in reduced absorption and, thus, in higher visible-light transmittance with simultaneously low emissivity.

The coating according to the invention is preferably applied on the surface of the substrate that is intended, in its installed position, to face an interior, for example, the interior of a building or of a vehicle. This is particularly advantageous with regard to the thermal comfort in the interior. The surface that is intended to face the interior of the pane is referred to in the context of the invention as the interior-side surface. The coating according to the invention can, in the case of high outside temperatures and sunlight, particularly effectively at least partially reflect the thermal radiation emitted by the entire pane in the direction of the interior. In the case of low outside temperatures, the coating according to the invention can effectively reflect the thermal radiation emitted from the interior and thus reduce the effect of the cold pane as a heat sink.

The coating according to the invention can be applied on the surface of the substrate over its entire area. However, the surface of the substrate can also have coating-free regions. The surface of the substrate can, for example, have a circumferential coating-free edge region and/or a coating-free region that serves as a data transmission window or a communication window. In the coating-free region, the pane is permeable to electromagnetic radiation and, in particular, to infrared radiation.

The substrate can also be provided on both surfaces with a thermal radiation reflecting coating according to the invention in each case.

In an advantageous embodiment of the invention, the substrate is bonded via at least one thermoplastic intermediate layer to a cover pane to form a composite pane (laminated pane). The cover pane is preferably intended to face the outside environment in the installed position of the composite pane, whereas the substrate faces the interior. Alternatively, the cover pane can also be intended to face the interior in the installed position of the composite pane. The coating according to the invention is preferably arranged on the surface of the substrate facing away from the cover pane.

The cover pane preferably contains glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The cover pane preferably has a thickness from 1.0 mm to 25 mm and particularly preferably from 1.4 mm to 4.9 mm.

The thermoplastic intermediate layer preferably contains thermoplastic plastics, for example, polyvinyl butyral (PVB), ethylene vinyl acetate (EVA), polyurethane (PU), polyethylene terephthalate (PET), or multiple layers thereof, preferably with thicknesses from 0.3 mm to 0.9 mm.

The composite pane has, in a preferred embodiment, total transmittance greater than 70% and interior-side emissivity less than or equal to 25%.

In an alternative advantageous embodiment, the composite pane has significantly reduced visible-light transmittance of, for example, less than 50%, less than 15%, less than 10%, or less than 6%. This can be achieved by the use of a tinted or colored cover pane or a tinted or colored substrate. Alternatively, a tinted or colored thermoplastic intermediate layer can be used or a tinted or colored film can be embedded in the thermoplastic intermediate layer.

In a preferred embodiment, the substrate is bonded via at least one thermoplastic intermediate layer to a cover pane to form a composite pane. The substrate is intended to face an interior in the installed position, whereas the cover pane faces the outside environment. The thermal radiation reflecting coating according to the invention is applied on the surface of the substrate facing away from the cover pane, i.e., on the interior-side surface of the substrate. The thickness of the barrier layer is from 10 nm to 40 nm, preferably from 10 nm to 30 nm. The composite pane has visible-light transmittance of less than 15%, preferably less than 10%, which is obtained by means of a tinted cover pane, a tinted substrate, and/or a tinted thermoplastic intermediate layer. The cover pane and the substrate can be curved. Such a composite pane with low transmittance and the coating according to the invention is particularly advantageous with regard to thermal comfort and an advantageously low value is obtained for the transmitted solar energy (TTS value [transmission of total solar energy]). The thermal radiation reflecting coating reduces the emission of solar energy absorbed by the tinted panes into the interior. In the range indicated for the thickness of the barrier layer, the coating according to the invention has advantageous bendability and corrosion resistance. In addition, it has surprisingly been demonstrated that aesthetic color values can be obtained by means of the barrier layer with a maximum thickness of 40 nm.

In a particularly advantageous embodiment, the coating according to the invention is applied on the surface of the substrate facing the interior, with the substrate constituting the pane of a composite pane facing the interior. A sun protection coating is further applied on the surface of the substrate facing the cover pane, on the surface of the cover pane facing the substrate, or on a carrier film in the thermoplastic intermediate layer. The sun protection coating is advantageously protected there against corrosion and mechanical damage. The sun protection coating preferably comprises at least one metallic layer based on silver or a silver-containing alloy with a thickness from 5 nm to 25 nm. Particularly good results are obtained with two or three functional layers that are separated from each other by dielectric layers with thicknesses from 10 nm to 100 nm. The sun protection coating reflects fractions of the incident sunlight outside the visible spectral range, in particular in the infrared spectral range. By means of the sun protection coating, the heating of the interior by direct sunlight is reduced. In addition, the sun protection coating reduces the heating of the elements in the composite pane arranged behind the sun protection coating and, thus, the thermal radiation emitted by the composite pane. Through the combination of the sun protection coating with the coating according to the invention for reflection of thermal radiation, the thermal comfort in the interior is advantageously improved.

The substrate can, for example, also be bonded to another pane via spacers to form an insulating glazing unit. The substrate can also be bonded to more than one other pane via thermoplastic intermediate layers and/or spacers.

The invention further includes a method for producing a pane according to the invention with thermal radiation reflecting coating, wherein on a substrate, at least
(a) one adhesion layer,
(b) one functional layer that contains at least one transparent, electrically conductive oxide (TCO),
(c) one dielectric barrier layer, and
(d) one antireflection layer are applied in succession, and
(e) the substrate is heated to a temperature of at least 200° C.

In an advantageous embodiment of the invention, a cover layer is applied after the application of the antireflection layer.

The individual layers are deposited by methods known per se, preferably by magnetic field-supported cathode sputtering. This is particularly advantageous with regard to simple, quick, economical, and uniform coating of the substrate. The cathode sputtering is done in a protective gas atmosphere, for example, of argon, or in a reactive gas atmosphere, for example, by addition of oxygen or nitrogen.

However, the individual layers can also be applied by other methods known to the person skilled in the art, for example, by vapor deposition or chemical vapor deposition (CVD), by plasma-enhanced chemical vapor deposition (PECVD), or by wet chemical methods.

In process step (e), after the application of the thermal radiation reflecting coating, the pane is subjected to a temperature treatment. The substrate with the coating according to the invention is heated to a temperature of at least 200° C., particularly preferably at least 300° C. The crystallinity of the functional layer is, in particular, improved by the temperature treatment. Thus, the visible-light transmittance and the reflecting properties relative for thermal radiation are significantly improved.

In a preferred embodiment of the method according to the invention, the temperature treatment in process step (e) occurs within a bending process. The substrate with the coating according to the invention is bent, in the heated state, in one or a plurality of spatial directions. The temperature to which the substrate is heated is preferably from 500° C. to 700° C. It is a particular advantage of the coating according to the invention for the reflection of thermal radiation that it can be subjected to such a bending process without being damaged.

Of course, other temperature treatment steps can occur before or after the bending process. Alternatively, a temperature treatment can be performed using laser radiation.

In an advantageous embodiment, after the temperature treatment in process step (e) and, optionally, after bending, the substrate can be prestressed or partially prestressed. For this, the substrate is suitably cooled in a manner known per se. A prestressed substrate typically has surface compressive stresses of at least 69 MPa. A partially prestressed substrate typically has surface compressive stresses from 24 MPa to 52 MPa. A prestressed substrate is suitable as single pane safety glass, for example, as a side window or rear window of a motor vehicle.

In an advantageous embodiment of the invention, after the temperature treatment and, optionally, after the bending process and/or the prestressing process, the substrate is bonded via at least one thermoplastic intermediate layer to a cover pane to form a composite pane. The substrate is preferably arranged in the composite such that the surface provided with the coating according to the invention faces away from the thermoplastic intermediate layer and the cover pane.

The invention further includes the use of the pane according to the invention with thermal radiation reflecting coating as a pane or as a component of a pane, in particular as a component of an insulating glazing unit or a composite pane, in buildings, in particular in access or window areas, as a built-in component in furniture and devices, in particular electronic devices with a cooling or heating function, for example, as an oven door or refrigerator door, or in means of transportation for travel on land, in the air, or on water, in particular in trains, ships, and motor vehicles, for example, as a windshield, side window, rear window, and/or roof panel.

The invention is explained in detail in the following with reference to drawings and exemplary embodiments. The drawings are schematic representations and not true to scale. The drawings in no way restrict the invention.

Figure 2:
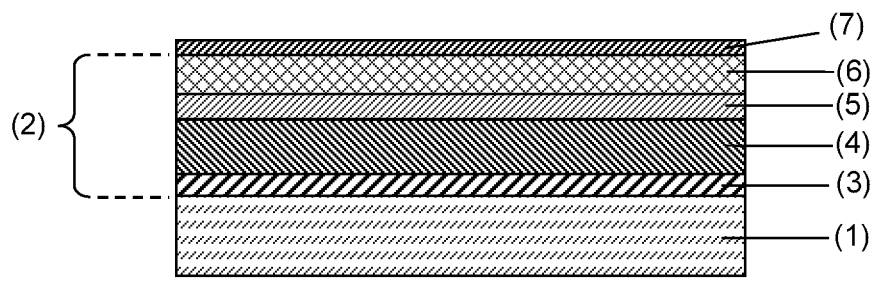
Figure 3:
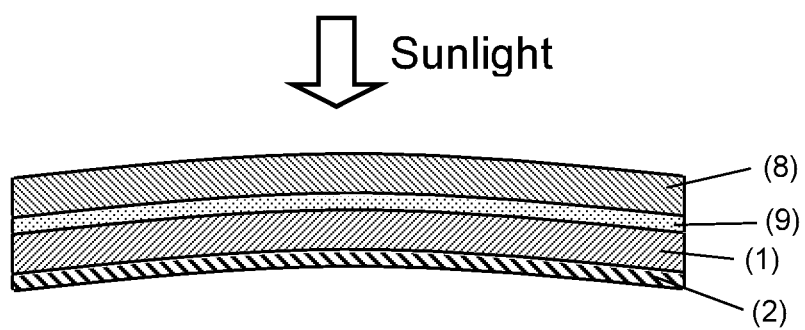
Figure 4:
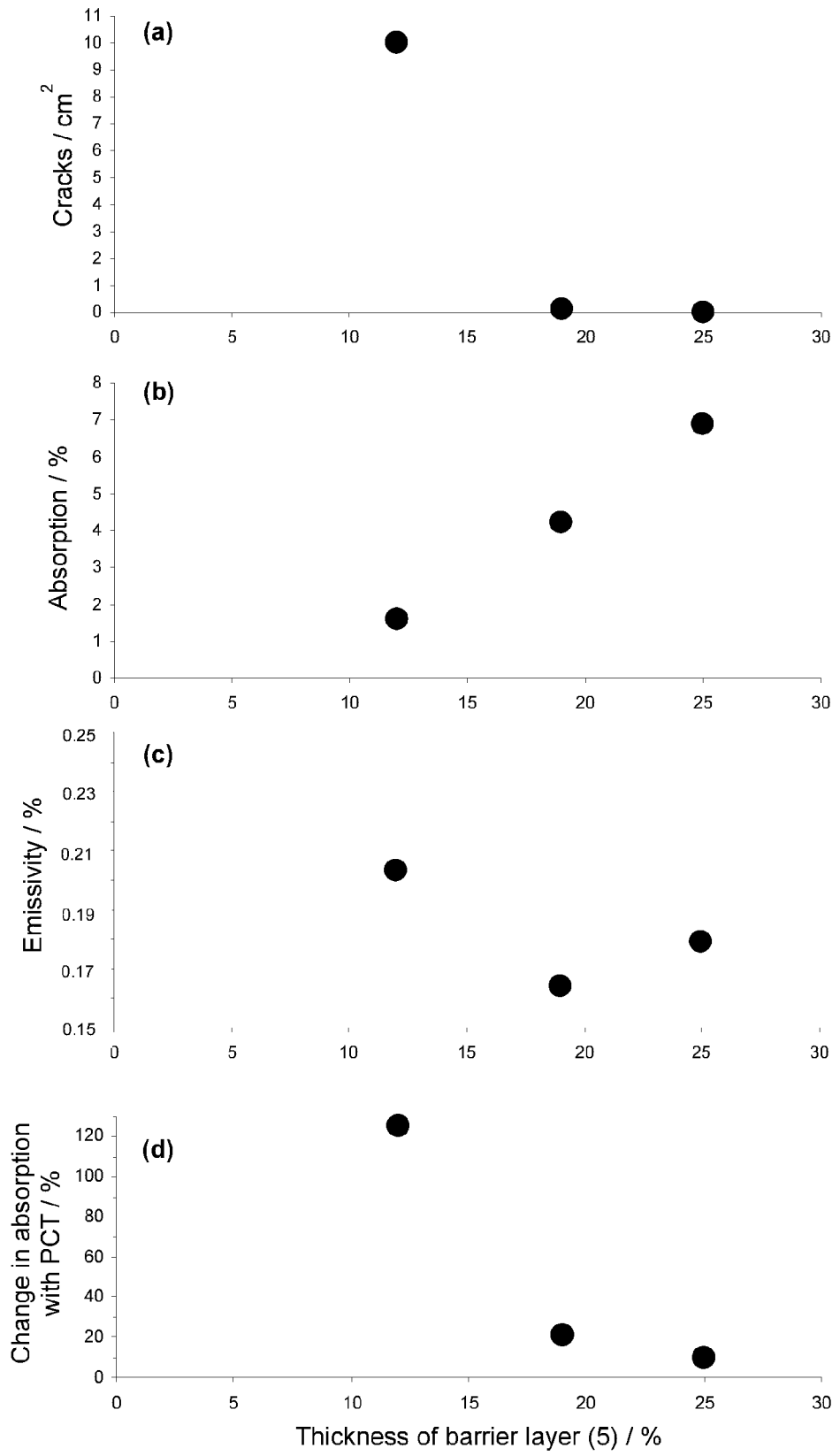
Figure 5:
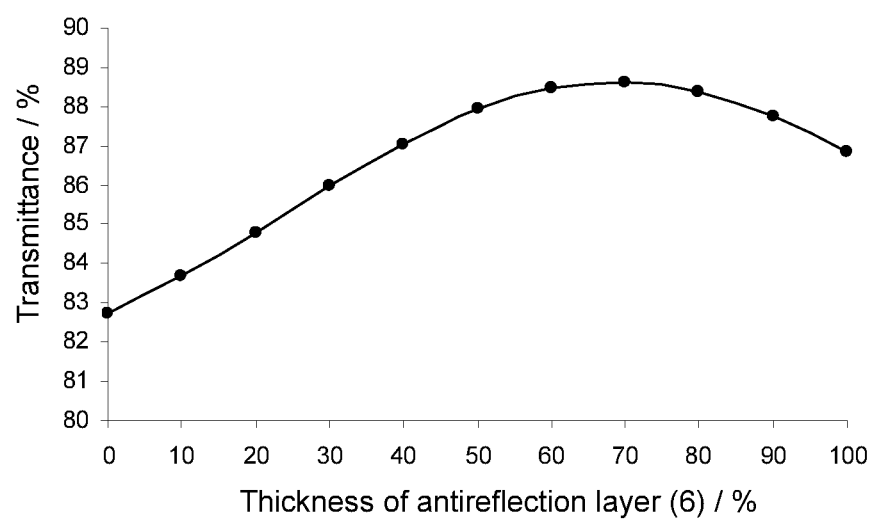
Figure 6:
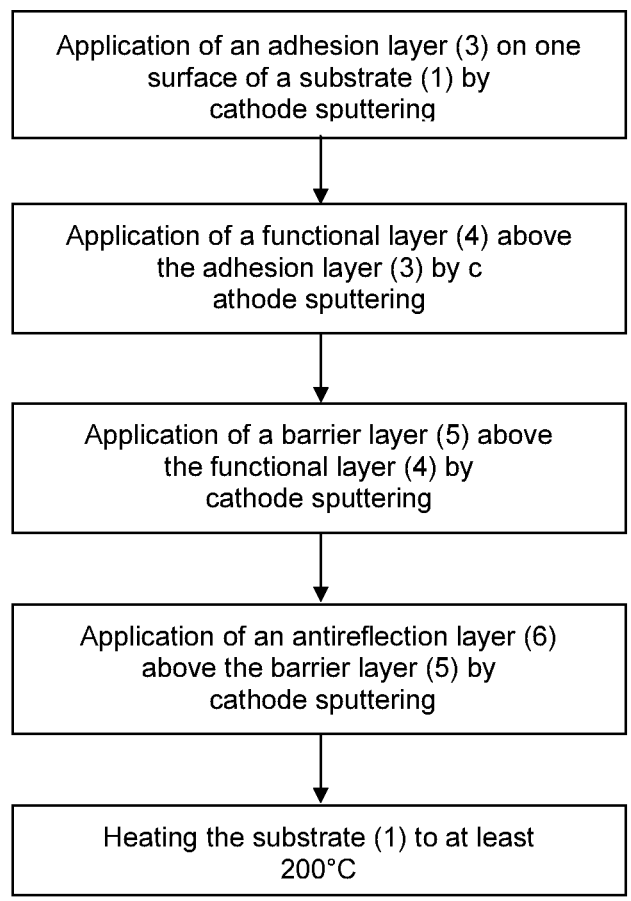

They depict:

FIG. 1 a cross-section through an embodiment of the pane according to the invention with thermal radiation reflecting coating, FIG. 2 a cross-section through another embodiment of the pane according to the invention with thermal radiation reflecting coating, FIG. 3 a cross-section through a composite pane comprising a pane according to the invention, FIG. 4 a diagram of the number of cracks in the thermal radiation reflecting coating, the absorption, and the emissivity of panes according to the invention after a bending process as well as the change in absorption of panes according to the invention in a pressure cooker test as a function of the thickness of the barrier layer, FIG. 5 a diagram of the transmittance in the visible spectral range through a pane according to the invention as a function of the thickness of the antireflection layer, and FIG. 6 a detailed flow chart of an embodiment of the method according to the invention.

FIG. 1 depicts a cross-section through an embodiment of the pane according to the invention with the substrate 1 and the thermal radiation reflecting coating 2. The substrate 1 contains soda lime glass and has a thickness of 2.9 mm. The coating 2 comprises an adhesion layer 3, a functional layer 4, a barrier layer 5, and an antireflection layer 6. The layers are arranged in the order indicated with increasing distance from the substrate 1. The precise layer sequence with suitable materials and exemplary layer thicknesses is presented in Table 1.

The individual layers of the coating 2 were deposited using magnetic field-supported cathode sputtering. The target for depositing the adhesion layer 3 and the antireflection layer 6 contained 92 wt.-% silicon and 8 wt.-% aluminum. The deposition took place under addition of oxygen as reaction gas during the cathode sputtering. The target for depositing the functional layer 4 contained 90 wt.-% indium oxide and 10 wt.-% tin oxide. The deposition took place under an argon protective gas atmosphere with an oxygen fraction of less than 1%. The target for depositing the barrier layer 5 contained 92 wt.-% silicon and 8 wt.-% aluminum. The deposition took place under addition of nitrogen as reaction gas during the cathode sputtering.

TABLE 1

| Reference Characters | Material | Thickness |
| --- | --- | --- |
| 6 | $SiO_2$:Al | 40 nm |
| 5 | $Si_3N_4$:Al | 20 nm |
| 4 | ITO | 120 nm |
| 3 | $SiO_2$:Al | 30 nm |
| 1 | Glass | 2.9 nm |

(Row for reference 6 also shows "2" in an unlabeled column between Reference Characters and Material.)

FIG. 2 depicts a cross-section through another embodiment of the pane according to the invention with the substrate 1 and the thermal radiation reflecting coating 2. The coating 2 is configured as in FIG. 1 with the adhesion layer 3, the functional layer 4, the barrier layer 5, and the antireflection layer 6. A cover layer 7 is arranged above the coating 2. The cover layer contains $Ta_2O_5$ and has a thickness of 10 nm. By means of the cover layer, the coating 2 is advantageously protected against mechanical damage, in particular against scratches.

FIG. 3 depicts a cross-section through a pane according to the invention with thermal radiation reflecting coating 2 as part of a composite pane. The substrate 1 is bonded to a cover pane 8 via a thermoplastic intermediate layer 9. The composite pane is intended as a windshield for a motor vehicle. The composite pane is curved as is customary for panes in the automotive sector. The surface of the substrate 1 that faces away from the cover pane 8 and the thermoplastic intermediate layer 9 is provided with the coating according to the invention 2. In the installed position of the composite pane, the cover pane 8 faces the outside environment and the substrate 1 faces the vehicle interior. The cover pane contains soda lime glass and has a thickness of 2.1 mm. The thermoplastic intermediate layer 9 contains polyvinyl butyral (PVB) and has a thickness of 0.76 mm.

The coating according to the invention 2 has low absorption of visible light. Consequently, the coating 2 does not substantially reduce the transmittance in the visible spectral range through the composite pane. The composite pane has transmittance in the visible spectral range greater than 70% and meets the legal requirements for windshields. The coating according to the invention 2 is, moreover, stable against corrosion from atmospheric oxygen and other environmental influences and can, consequently, be arranged on the surface of the composite pane facing the vehicle interior, where it particularly effectively results in an improvement of the thermal comfort in the vehicle interior. The coating 2 reflects part of the sunlight incident on the composite pane, in particular in the infrared range. The thermal radiation emitted by the warm composite pane in the direction of the vehicle interior is also at least partially suppressed by the low emissivity of the coating 2. Thus, the interior is less strongly heated in the summer. In the winter, the thermal radiation emitted from the interior is reflected. Consequently, the cold composite pane acts less strongly as an unpleasant heat sink. Moreover, the necessary heating output of the air-conditioning system can be reduced, which results in a significant energy savings.

The coating 2 is preferably applied on the flat substrate 1 before the bending of the substrate 1. Coating a flat substrate is technically significantly simpler than coating a curved substrate. The substrate 1 is then typically heated to a temperature from 500° C. to 700° C., for example, 640° C. On the one hand, the temperature treatment is necessary to bend the substrate 1. On the other hand, the visible-light transmittance and the emissivity of the coating 2 are regularly improved by the temperature treatment. The barrier layer according to the invention 5 influences the extent of oxidation of the functional layer 4 during the temperature treatment. The oxygen content of the functional layer 4 is sufficiently low after the temperature treatment that the coating 2 can be subjected to a bending process. An excessively high oxygen content would result in damage to the functional layer 4 during bending. On the other hand, the oxygen content of the functional layer 4 is sufficiently high after the temperature treatment for high visible-light transmittance and low emissivity. This is a major advantage of the present invention.

In an alternative embodiment, the composite pane can also have low visible-light transmittance of, for example, less than 10%. Such composite panes can, for example, be used as a rear window or a roof panel. By means of the coating according to the invention 2, which has a barrier layer 5 with a thickness from 10 nm to 40 nm, advantageous color values are also obtained in addition to flexibility and corrosion resistance.

FIG. 4 depicts observations on three test panes. The test panes were deposited using cathode sputtering with the targets and conditions cited in FIG. 1. The test panes with the substrate 1 and the thermal radiation reflecting coating 2 differed in the thickness of the barrier layer 5. The layer sequence, materials, and layer thicknesses of test panes are summarized in Table 2.

TABLE 2

| Reference Characters | Material | Thickness | | |
|---|---|---|---|---|
| | | Example 1 | Example 2 | Example 3 |
| 2 | | | | |
| 6 | SiO$_2$:Al | 45 nm | 45 nm | 45 nm |
| 5 | Si$_3$N$_4$:Al | 12 nm | 19 nm | 25 nm |
| 4 | ITO | 120 nm | 120 nm | 120 nm |
| 3 | SiO$_2$:Al | 30 nm | 30 nm | 30 nm |
| 1 | Glass | 2.9 mm | 2.9 mm | 2.9 mm |

The substrate 1 was initially flat and was provided with the coating 2 according to the invention. The substrate 1 with the coating 2 was then subjected for 10 minutes to a temperature treatment at 640° C., bent at that time, and provided with a radius of curvature of roughly 30 cm. The barrier layer 5 was deposited as aluminum-doped Si$_3$N$_4$ and is reported as such in the table. Due to partial oxidation during the temperature treatment, the barrier layer can, however, also contain Si$_x$N$_y$O$_z$.

In part (a) of the diagram, the number of cracks per cm$^2$ in the coating 2 after the bending process is plotted against the thickness of the barrier layer 5. It can be discerned that the number of cracks increases greatly if the barrier layer 5 is too thin. The reason for this appears to be excessively high oxidation of the functional layer 4 during the temperature treatment. The excessively high oxidation of the functional layer 4 cannot be effectively reduced by an excessively thin barrier layer 5.

In part (b) of the diagram, the absorption of visible light during passage through the pane is plotted against the thickness of the barrier layer 5. The absorption increases with the thickness of the barrier layer 5. The absorption by the coating 2 is a function of the oxygen content of the functional layer 4. The oxygen content of the functional layer 4 is a function of the thickness of the barrier layer 5. An excessively thick barrier layer 5 results in an excessively low oxygen content of the functional layer 4. An excessively low oxygen content of the functional layer 4 results in excessively high absorption and and thus impairs vision through the pane. In addition, the color values of the pane shift undesirably with an increasing thickness of the barrier layer 5.

In part (c) of the diagram, the emissivity of the test panes is plotted against the thickness of the barrier layer 5. The emissivity is a function of the thickness of the barrier layer 5. This effect seems to be caused by the oxygen content of the functional layer 4 influenced by the barrier layer 5.

In part (d) of the diagram, a result of the pressure cooker test (PCT) is presented. In the pressure cooker test, the pane is hermetically sealed in a metal container partially filled with water and heated for 48 hours to a temperature of 120° C. In this process, the pane is exposed to high pressure and hot steam and the pane can be tested for corrosion resistance. In the diagram, the relative change in absorption of the pane after the pressure cooker test compared to the absorption before the pressure cooker test is reported as a function of the thickness of the barrier layer 5. A large change in absorption indicates corrosion of the coating 2 during the pressure cooker test. It is discernible that the corrosion resistance of the coating 2 increases with the increasing thickness of the barrier layer 5.

The particular advantage of the range according to the invention for the thickness of the barrier layer 5 is evident from the diagram. The thickness of the barrier layer 5 from 10 nm to 40 nm is selected according to the invention such that the coating 2 can, on the one hand, be subjected to a bending process (i.e., has, after bending, no cracks or only a small number of cracks) and, on the other, has sufficiently low absorption (of less than roughly 15%), sufficiently low emissivity (of less than roughly 25%), and advantageous corrosion resistance.

Particularly good results with regard to flexibility, absorption of visible light, and emissivity are obtained when the thickness of the barrier layer 5 is from 12 nm to 30 nm and in particular 15 nm to 25 nm. By means of a barrier layer 5 with a thickness from 15 nm to 25 nm, absorption of less than roughly 7% and emissivity of less than roughly 20% are obtained.

It can also be seen from the diagram that the thickness of the barrier layer 5 can be selected smaller when the substrate is not to be bent. In this case, no consideration of cracks in the coating 2, which would develop with a bending process, need be taken.

Thus, lower absorption of visible light and, at the same time, advantageously low emissivity can be obtained. When the coating 2 is applied on a flat substrate 1, absorption of less than 5% and emissivity of less than roughly 20% can be obtained with a barrier layer 5 that has a thickness in the range from 12 nm to 18 nm.

Table 3 summarizes some properties of the test panes. $R_{Square}$ is the sheet resistance of the coating 2. A is the absorption of visible light of the pane. The absorption of the coating 2 is calculated by subtraction of the absorption of the uncoated substrate 1 of roughly 1.5%. $\in_n$ is the normal emissivity of the panes. $T_L$ indicates the transmittance of the panes for visible light. $R_L$ indicates the reflectivity of the panes for visible light. The data a* and b* are based on the color coordinates in reflection according to the colorimetric model (L*a*b* color space), observed from the side of the pane provided with the coating 2.

TABLE 3

| | Before temperature treatment | | After temperature treatment and bending | | | | | | |
|---|---|---|---|---|---|---|---|---|---|
| | $R_{Square}$ [ohm/square] | A | $R_{Square}$ [ohm/square] | $\epsilon_n$ | A | $T_L$ | $R_L$ | a* | b* |
| Example 1 | 109 | 19% | 21 | 0.2 | 2% | 93% | 5% | 4.5 | −14 |
| Example 2 | 109 | 20% | 15 | 0.16 | 4% | 91% | 5% | 2.5 | −11 |
| Example 3 | 113 | 20% | 19 | 0.18 | 7% | 88% | 5% | 1.8 | −9 |

The sheet resistance and absorption before the temperature treatment are a function of the oxygen content of the functional layer 4. The target and the oxygen content of the atmosphere during application of the functional layer 4 are appropriately selected for this. By means of the temperature treatment, the sheet resistance was significantly reduced, which resulted in advantageously low emissivity. The panes had high transmittance and advantageous color values and can, consequently, be used, for example, as windshields.

FIG. 5 depicts the result of a simulation of the transmittance in the visible spectral range as a function of the thickness of the antireflection layer 6. The substrate 1, the adhesion layer 3, the functional layer 4, and the barrier layer 5 were configured in the simulation as in Table 2, Example 2. The thickness of the antireflection layer 6 made of $SiO_2$ was varied during the simulation. An antireflection layer 6 with a thickness in the range from 40 nm to 100 nm results, due to significantly reduced reflection on the coating 2, in particularly advantageous transmittance through the pane greater than or equal to roughly 87%.

FIG. 6 depicts a flowchart of an exemplary embodiment of the method according to the invention for producing a pane with thermal radiation reflecting coating 2. An adhesion layer 3, a functional layer 4, a barrier layer 5, and an antireflection layer 6 are applied in succession on a surface of a substrate 1 using magnetic field-supported cathode sputtering. The applied layers 3,4,5,6 form the thermal radiation reflecting coating 2. The substrate 1 is subsequently subjected to a temperature treatment at at least 200° C.

The temperature treatment can also take place within a bending process in which the substrate 1 is, for example, heated to a temperature of 640° C. and bent.

The substrate 1 can subsequently be bonded, for example, via a thermoplastic intermediate layer 9 to an identically curved cover pane 8 to form a composite pane. The substrate 1 is arranged in the composite such that the surface of the substrate 1 on which the coating 2 is applied faces away from the thermoplastic intermediate layer 9.

The substrate 1 can also be prestressed after the temperature treatment and, optionally, after bending.

LIST OF REFERENCE CHARACTERS (1) substrate
(2) thermal radiation reflecting coating
(3) adhesion layer
(4) functional layer
(5) barrier layer
(6) antireflection layer
(7) cover layer
(8) cover pane
(9) thermoplastic intermediate layer

The invention claimed is:

1. A pane, comprising:
   at least one substrate, the substrate being curved, and
   at least one thermal radiation reflecting coating applied on an interior-side surface of the substrate prior to making the substrate curved,
   wherein the coating on the substrate includes at least:
      an adhesion layer in contact with the substrate,
      above the adhesion layer, a functional layer that contains at least a transparent, electrically conductive oxide,
         above the functional layer, a dielectric barrier layer for regulating oxygen diffusion, and
      above the barrier layer, an antireflection layer, and
   wherein the barrier layer has a thickness from 15 nm to 25 nm, the thickness of the barrier layer being adapted to reduce cracks in the coating during a step of making the pane curved.

2. The pane according to claim 1, wherein the substrate is bonded via at least one thermoplastic intermediate layer to a cover pane to form a composite pane and wherein the coating is arranged on a surface of the substrate facing away from the cover pane.

3. The pane according to claim 2, wherein the composite pane has visible-light transmittance of less than 10%.

4. The pane according to claim 2, wherein a sun protection coating is arranged on a surface of the substrate facing the cover pane, on the surface of the cover pane facing the substrate or in the thermoplastic intermediate layer.

5. The pane according to claim 1, wherein the functional layer contains at least fluorine-doped tin oxide, antimony-doped tin oxide, or indium tin oxide and has a thickness from 90 nm to 150 nm.

6. The pane according to claim 1, wherein the barrier layer contains a material with a refractive index from 1.7 to 2.3, at least an oxide or a nitride.

7. The pane according to claim 1, wherein the adhesion layer contains at least an oxide, and has a thickness from 15 nm to 50 nm.

8. The pane according to claim 1, wherein the antireflection layer contains at least an oxide with a refractive index less than or equal to 1.8, has a thickness from 20 nm to 150 nm.

9. The pane according to claim 1, wherein a cover layer that contains at least an oxide is arranged above the coating, and has a thickness from 2 nm to 50 nm.

10. The pane according to claim 1, that has an interior-side emissivity less than or equal to 25%.

11. The pane according to claim 1, wherein the substrate has a transmittance in a visible spectral range greater than or equal to 70% or less than 50%.

12. A method comprising:
using the pane with thermal radiation reflecting coating according to claim 1 as a pane or as a component of a pane in buildings or in means of transportation for travel on land, in the air, or on water.

13. The method of claim 12, wherein using the pane according to claim 1 includes using the pane as a component of an insulating glazing unit or a composite pane in buildings.

14. The method of claim 12, wherein using the pane in means of transportation includes using the pane in trains, ships, and motor vehicles.

15. The method of claim 14, wherein using the pane in motor vehicles includes using the pane in a windshield, rear window, side window, and/or roof panel.

16. The pane according to claim 1, wherein the barrier layer has a thickness from 18 nm to 22 nm.

17. The pane according to claim 1, wherein the adhesion layer contains silicon dioxide ($SiO_2$), the barrier layer contains silicon nitride ($Si_3N_4$) or silicon oxynitride ($Si_xN_yO_z$), and the antireflection layer contains silicon dioxide ($SiO_2$).

18. A pane, comprising:
at least one substrate, the substrate being planar, and
at least one thermal radiation reflecting coating applied on an interior-side surface of the substrate,
wherein the coating on the substrate includes at least:
an adhesion layer in contact with the substrate,
above the adhesion layer, a functional layer that contains at least a transparent, electrically conductive oxide,
above the functional layer, a dielectric barrier layer for regulating oxygen diffusion, and
above the barrier layer, an antireflection layer, and
wherein the barrier layer has a thickness from 12 nm to 18 nm adapted to promote a higher oxygen content of the coating after a temperature treatment of the pane so as to reduce absorption of visible-light and simultaneously provide a low emissivity of the pane.

19. The pane according to claim 4, wherein the adhesion layer contains silicon dioxide ($SiO_2$), the barrier layer contains silicon nitride ($Si_3N_4$) or silicon oxynitride ($Si_xN_yO_z$), and the antireflection layer contains silicon dioxide ($SiO_2$).

20. A pane adapted for bendability, comprising:
at least one substrate, the substrate being planar, and
at least one thermal radiation reflecting coating applied on an interior-side surface of the substrate,
wherein the coating on the substrate includes at least:
an adhesion layer in contact with the substrate,
above the adhesion layer, a functional layer that contains at least a transparent, electrically conductive oxide,
above the functional layer, a dielectric barrier layer for regulating oxygen diffusion, and
above the barrier layer, an antireflection layer, and
wherein the barrier layer has a thickness from 15 nm to 25 nm, the thickness of the barrier layer being adapted to reduce cracks in the coating during a step of bending the pane.

* * * * *